United States Patent [19]

Merriam

[11] 3,889,141
[45] June 10, 1975

[54] SIX POLE PERMANENT MAGNET MOTOR

[75] Inventor: Frank R. Merriam, Northville, Mich.

[73] Assignee: Ford Motor Company, Dearborn, Mich.

[22] Filed: May 24, 1973

[21] Appl. No.: 363,992

[52] U.S. Cl. .............................. 310/154; 310/254
[51] Int. Cl. .................... H02k 21/26; H02k 23/04
[58] Field of Search .......... 310/154, 239, 152, 258, 310/259, 254

[56] References Cited
UNITED STATES PATENTS

| | | | |
|---|---|---|---|
| 2,456,701 | 12/1948 | Hansen et al. | 310/154 |
| 2,513,226 | 6/1950 | Wylie | 310/154 |
| 2,513,227 | 6/1950 | Wylie | 310/154 |
| 2,971,107 | 2/1961 | Jin | 310/239 |
| 3,089,047 | 5/1963 | Perzyk | 310/239 |
| 3,138,728 | 6/1964 | Videtic | 310/239 |
| 3,296,471 | 1/1967 | Cochardt | 310/154 |
| 3,521,096 | 7/1970 | Merriam | 310/154 |
| 3,766,418 | 10/1973 | Apostoleris | 310/154 |

FOREIGN PATENTS OR APPLICATIONS

| | | | |
|---|---|---|---|
| 198,829 | 7/1958 | Austria | 310/154 |
| 923,477 | 4/1963 | United Kingdom | 310/154 |
| 924,347 | 4/1963 | United Kingdom | 310/154 |

Primary Examiner—J. D. Miller
Assistant Examiner—Patrick R. Salce
Attorney, Agent, or Firm—Robert A. Benziger; Keith L. Zerschling

[57] ABSTRACT

A permanent magnet dynamoelectric machine having an armature and a housing rotatably supporting the armature. A plurality of permanent magnets and two ferromagnetic flux path members are mounted in the housing. Each of the flux path members has end portions engaging two of the permanent magnets. All of the permanent magnets in contact with one flux path member are polarized to have a commonly designated magnetic pole facing the armature and the opposite magnetic pole engaging the ends of the ferromagnetic flux path members. All of the permanent magnets in contact with the other flux path member are polarized to have the opposite magnetic pole facing the armature and the commonly designated magnetic pole engaging the ends of the flux path members. Consequent poles of opposite polarity are formed in the central portion of the two ferromagnetic flux path members. These consequent poles combine with the magnetic poles to produce a six pole dynamoelectric machine using only four permanent magnets.

16 Claims, 5 Drawing Figures

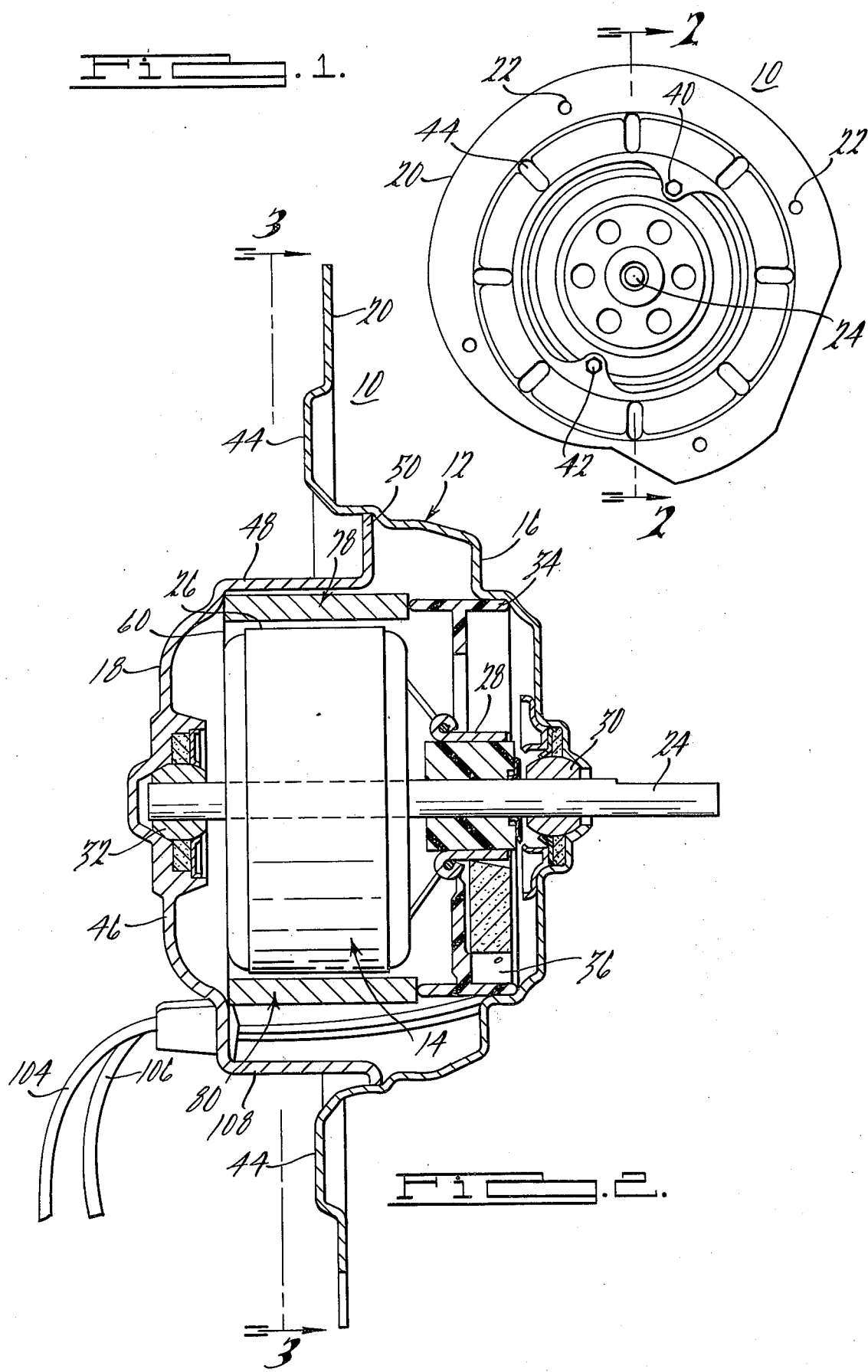

SIX POLE PERMANENT MAGNET MOTOR

BACKGROUND OF THE INVENTION

This invention relates to permanent magnet dynamoelectric machines and, more particularly, to permanent magnet dynamoelectric machines that may be employed as windshield wiper motors or as air conditioning or heater blower motors for automotive vehicles. It is known in the prior art to construct permanent magnet dynamoelectric machines by using a plurality of flat block permanent magnets which are positioned in engagement with a pair of ferromagnetic flux path members. The flat block permanent magnets and the ferromagnetic flux path members are held in engagement by plastic clip means. Such a structure is disclosed and claimed in my U.S. Pat. No. 3,521,096, assigned to the assignee of the present invention.

The permanent magnet dynamoelectric machine disclosed in the above mentioned patent has permanent magnets with poles oriented such that two of the permanent magnets have south poles facing the armature of the machine and two of the other permanent magnets have north poles facing the armature. The magnets are so arranged that each flux path member has a magnetic north pole at one end and a magnetic south pole at the other end and the south poles of adjacent flux path members are arranged to be adjacent so that a two pole permanent magnet dynamoelectric machine results.

The present invention is also related to my copending commonly assigned patent application Ser. No. 202,994. The permanent magnet dynamoelectric machine disclosed and claimed in patent application Ser. No. 202,994 has four permanet magnets disposed with a commonly designated magnet pole facing the rotor or armature of the machine. Pairs of permanent magnets are situated at the remote ends of flux path members so that consequent poles of opposite polarity to the commonly designated pole are formed intermediate the ends of the flux path members to form a four pole permanent magnet dynamoelectric machine.

The present invention is an improvement over the dynamoelectric machine disclosed in U.S. Pat. No. 3,521,096 and my copending application, both as described above. The present invention provides a consequent pole, six pole dynamoelectric machine requiring only four permanent magnets with attendant increases in efficiency and decreases in the quantity of magnetic material and conductive wire needed to wind the armature when compared with the previously described two and four pole dynamoelectric machines of comparable performance.

SUMMARY OF THE INVENTION

In the present invention a six pole permanent magnet dynamoelectric machine is provided. It comprises a plurality of permanent magnets, preferably four in number, that preferably are of a flat block configuration. Two ferromagnetic flux path members having flat end portions are provided with each of the flat end portions being positioned in engagement with one of the flat block permanent magnets. The flat block permanent magnets in contact with one of the flux path members are polarized such that the same magnetic pole, for example, the north pole, faces the armature of the machine in radial spaced relationship. The other pole, for example, the south pole, of each of these permanent magnets is positioned in engagement with an end portion of the flux path member. The flux path member has a central or body portion positioned in radial spaced relationship with respect to the armature of the machine and at a distance to form a consequent field pole for the machine of a polarity which is the same as the polarity of the poles of the flat block permanent magnets that are positioned in engagement with the ferromagnetic flux path member, for example here, the south pole.

The permanent magnets in contact with the other ferromagnetic flux path member are oppositely polarized so that, using the exemplary polarity specified above, the south magnetic poles of the permanent magnets face the armature of the machine in radial spaced relationship while the north magnetic poles are in contact with the ends of the flux path members. The central, or body, portion of the flux path member is positioned in radial spaced relationship with respect to the armature at a distance to form a consequent pole of, for example here, a north pole.

As a result of the above described structure, a six pole dynamoelectric machine is provided which utilizes approximately two times as much flux from the permanent magnets as the two pole permanent magnet machine described above and disclosed in my U.S. Pat. No. 3,521,096. This results in a substantial saving in the amount of magnetic material needed to produce a motor having comparable performance characteristics as a motor produced in accordance with either of the teachings of my above mentioned patent and patent application. Also, the amount of conductive wire needed to wind the armature is substantially reduced.

In the preferred embodiment of my invention, the housing of the permanent magnet machine is constructed of a non-ferromagnetic material, for example, plastic or diecast aluminum. The permanent magnets and the ferromagnetic flux path members may be pressfitted into this housing which is provided with a structure for receiving these components in the pressfit relationship. The housing is further provided with means for piloting and retaining the permanent magnets in proper circumferential and radial position within the dynamoelectric machine.

An object of the present invention is the provision of a highly efficient permanent magnet dynamoelectric machine.

Another object of the present invention is the provision of a permanent magnet dynamoelectric machine that utilizes a minimum of magnetic material and armature winding material.

A further object of the invention is the provision of a permanent magnet dynamoelectric machine that may be readily and easily assembled in production.

A further object of the present invention is the provision of a six pole permanent magnet motor which requires only four permanent magnets.

Other objects and attendant advantages of the present invention may be more readily realized as the specification is considered in connection with the attached drawings.

BRIEF DESCRIPTION OF THE DRAWINGS

FIG. 1 is an end elevational view of the dynamoelectric machine of the present invention;

FIG. 2 is a sectional view taken along the lines 2—2 of FIG. 1;

DESCRIPTION OF THE PREFERRED EMBODIMENT

Figure 3:
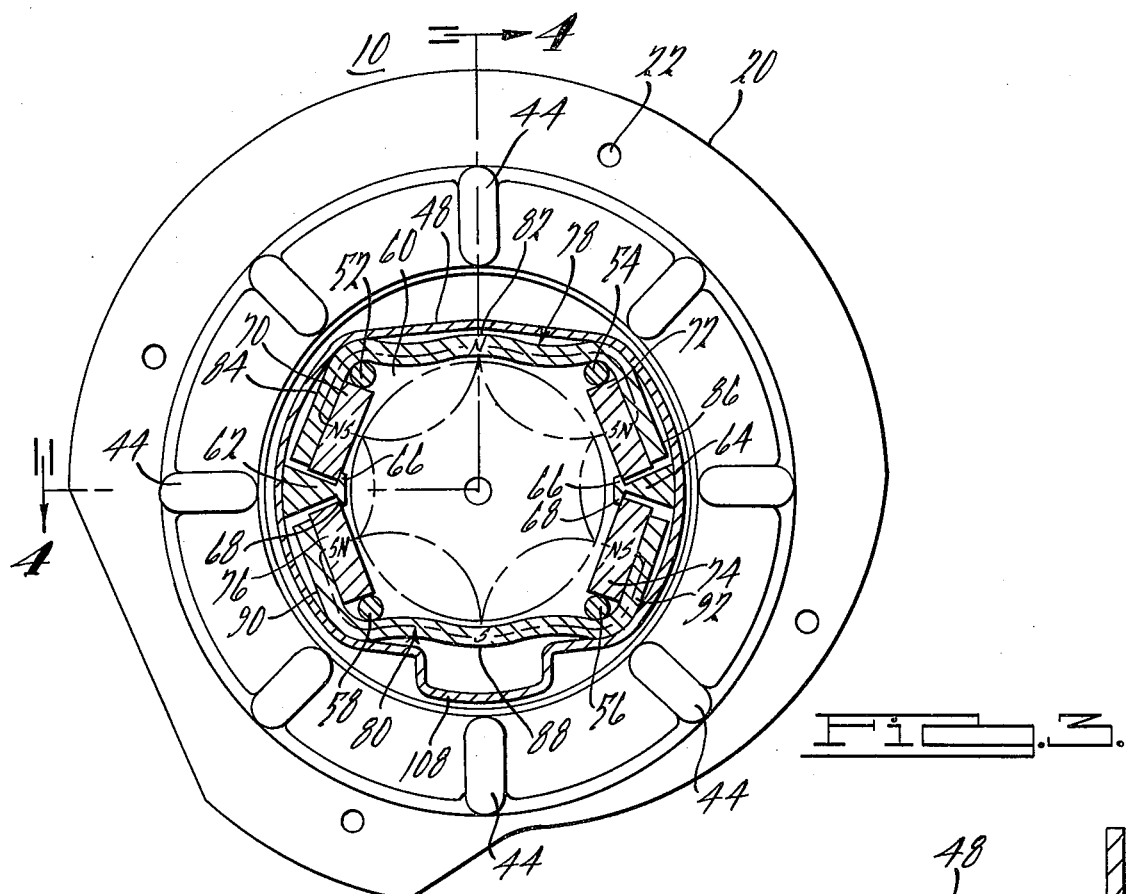
FIG. 3 is a sectional view taken along the lines 3—3 of FIG. 2.

Referring now to the drawings, there is shown in FIGS. 1 through 3 the permanent magnet dynamoelectric machine 10 of the present invention having a stator structure 12 and a rotor or armature 14. The stator structure 12 comprises a pair of cup-shaped housing members 16 and 18. The cup-shaped housing member 16 includes a radially outwardly extending mounting flange 20 having a plurality of apertures 22 for properly mounting the dynamoelectric machine 10 in a structure, for example, an automotive vehicle.

The rotor or armature 14 includes a shaft 24, a winding portion 26 and a commutator 28 which is suitably connected to the windings of the winding portion 26 in a conventional manner. The cup-shaped housing portion 16 of the stator portion 12 has a conventional sleeve-type bearing 30 for rotatably mounting one end of the rotor or armature shaft 24, and the cup-shaped housing member 18 of the stator portion 12 has a similar conventional sleeve-type bearing 32 for rotatably mounting the other end of the armature shaft 24.

Figure 5:
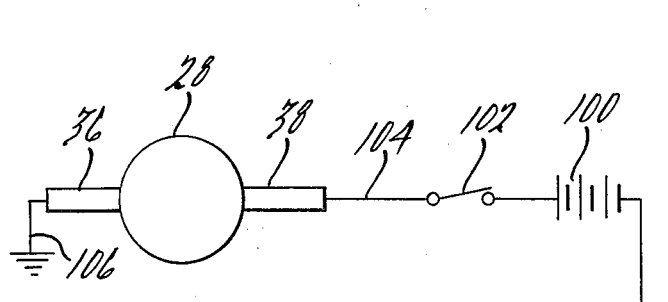
FIG. 5 is a simplified circuit diagram showing of the dynamoelectric machine of the present invention from a source of direct current electrical energy.

The stator 12 also includes a brush holder 34 which holds brushes 36 and 38, which may be positioned at substantially 60° or substantially 180° angles with respect to one another, in engagement with the commutator 28. The 60° angular placement relationship is shown in these Figures while FIG. 5 illustrates the 180° angular placement. Any suitable brush holding mechanism, which includes biasing means for biasing the brushes 36 and 38 into engagement with the commutator 28, may be employed.

A pair of bolts 40 and 42 shown in FIG. 1 are employed to fasten the first cup-shaped housing member 16 and the second cup-shaped housing member 18 together to form the stator 12. The radially extending mounting flange 20 of the cup-shaped member 16 has a plurality of indented or struck-out pads 44 for engagement with a supporting structure to hold the dynamoelectric machine in proper angular position with respect to this supporting structure.

Figure 4:
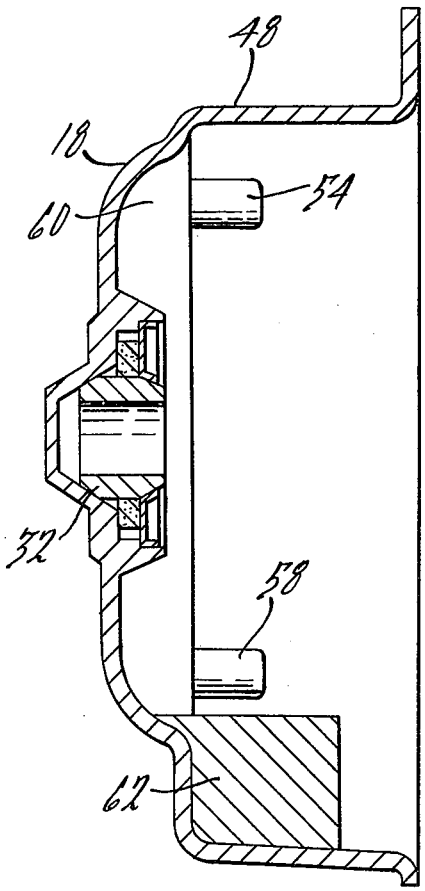
FIG. 4 is a sectional view of a housing portion of the dynamoelectric machine taken along the lines 4—4 of FIG. 3.

Referring now to FIGS. 2, 3 and 4, it can be seen that the cup-shaped housing member 18 has an end wall 46 and an axially extending portion or flange 48 formed integrally therewith. A radially extending flange 50 is formed integrally with the axially extending flange or portion 48 and this radially extending flange or portion 50 is positioned in engagement with the first housing portion 16. The flange or portion 50 includes means (not shown) for receiving the fastening bolts 40 and 42 shown in FIG. 1 that fasten the first cup-shaped housing member 16 and the second cup-shaped housing member 18 in assembled relationship. As shown more specifically in FIGS. 3 and 4, four extending pins or supports 52, 54, 56 and 58 are formed integrally on an axially extending platform 60 that extends around the circumference of the winding portion 26 of armature 14. The cup-shaped housing member 18 also has a pair of radially inwardly extending locating tabs 62 and 64 that are formed integrally with the axially extending portion or flange 48. Each of these radially inwardly extending tabs or fastening means has a pair of circumferentially extending ledges 66 and 68. The cup-shaped housing member 18 is formed from a nonmagnetic material, for example, plastic or aluminum.

As shown in FIG. 3, the field structure for the dynamoelectric machine 10 of the present invention comprises a plurality of permanent magnets, preferably four flat block permanent magnets of the ceramic type designated by the numerals 70, 72, 74 and 76. These flat block permanent magnets are preferably rectangular in configuration and are polarized in a radial direction with respect to the axis of the armature or rotor 14.

A pair of ferromagnetic flux path members 78 and 80 are provided. The flux path member 78 has a central body portion 82, a flat portion 84 extending at an angle with respect to the body portion 82 at one end thereof, and another flat portion 86 extending from the body portion 82 at the other end thereof. Similarly, the flux path member 80 has a central body portion 88 with a flat portion 90 extending at an angle therefrom at one end thereof and another flat portion 92 extending at an angle therefrom at the other end thereof.

It can be appreciated by an inspection of FIG. 3 that the axial extending portion or flange 48 of the second cup-shaped housing 18 conforms generally to the configuration of the two flux path members 78 and 80. Consequently, during the assembly of the dynamoelectric machine of the present invention, the two flux path members 78 and 80 may be inserted axially into the second cup-shaped housing member 18 so that the outer walls or surfaces thereof are in engagement at selected portions, particularly at the intersection of the main body portions and the flat portions with the inner surface of the axially extending portion or flange 48 of the second cup-shaped housing 18. The axially extending pins 52, 54, 56 and 58 engage the inner surface or walls of the ferromagnetic flux member 78 and 80 to thereby position the two flux path members 78 and 80 in a pressfit relationship within the second cup-shaped housing member 18.

The permanent magnets 70, 72, 74 and 76 may then be inserted axially into the cup-shaped housing member 18, as shown in FIG. 3, in a position where the circumferentially extending ledges 66 and 68 on the radially inwardly extending tabs or supports 62 and 64 support the permanent magnets in a radial relationship. Tabs or supports 62 and 64 must be of a nonmagnetic material to minimize leakage flux between the magnet pairs 70, 76 and 72, 74 are preferably formed with and integral to the cup-shaped housing portion 18. The opposite edge of each of the permanent magnets 70, 72, 74 and 76 is in engagement with its associated axially extending pin 52, 54, 56 and 58, respectively. It can also be appreciated that the magnetic force of the four permanent magnets holds them into engagement with the flat portions 84, 86, 90 and 92 of the flux path members 78 and 80.

Each of the flat block permanent magnets 70, 72, 74 and 76 is polarized in a radial direction with respect to the axis of the dynamoelectric machine 10 and the rotor or armature 14. The permanent magnets in contact with one flux path members are polarized to position, in radial-spaced relationship, a first commonly designated magnet pole directed toward the rotor or armature while the oppositely designated poles are in contactive engagement with the respective flat end portions of the flux path member. Thus permanent magnets 70, 72 are polarized with their north magnetic pole in contact with the end portions 84, 86 respectively of flux path member 78 while the south magnetic poles of permanent magnets 70, 72 are facing armature 14. The central or body portion of flux path member 78 is radially spaced from armature 14 a distance substantially equal to the spacing of the permanent magnets 70, 72 and the armature 14 so that a consequent pole is formed having the same polarity as the polarity of the magnetic poles in contact with the end portion 84, 86 of the flux path member 78 (i.e., a north magnetic pole).

The permanent magnets, here magnets 74, 76, in contact with the other flux path member, here member 80, are oppositely polarized so that the oppositely designated pole (as illustrated, and for purposes of example, the north magnetic pole) is directed toward the armature 14 while the first commonly designated pole (the south magnetic pole) is in contactive engagement with the flat end portions 90, 92 of the flux path member 80. Central or body portion 88 of flux path member 80 is radially spaced from armature 14 a distance substantially equal to the spacing between the permanent magnets 74, 76 and the armature 14 so that a consequent pole is formed having the same polarity as the polarity of the magnetic poles in contact with the flat end portions 90, 92 of the flux path member 80 (i.e., a south magnetic pole).

The flux paths through the armature of the machine and through the flux path member 78 and 80 are shown in dotted lines on the drawing and it can be appreciated that six separate flux paths through the armature are established and that a consequent pole is formed in the central or body portion 82 and 88 of the flux path member 78 and 80, respectively. These central or body portions 82 and 88 may be formed to have a central arcuate shape which conforms with the arcuate shape of the armature 14 with a spacing substantially equal to the spacing between the inner faces of the permanent magnets 70, 72, 74 and 76 and the outer surface of the armature 14.

As shown in FIG. 5, a source of electrical energy in the form of a storage battery 100 may be employed to energize the brush 38 through an on-off switch 102 which is positioned in lead 104. The other brush 36 is connected to ground through a lead 106. These leads are also shown in FIG. 2 and they extend from the brushes 38 and 36 through a radially extending portion 108 in the axially extending portion or flange 48 of the second cup-shaped housing member 18.

As a result of this structure, a highly efficient permanent magnet dynamoelectric machine is formed which has six poles and six separate flux paths through the armature of the machine and which only requires four permanent magnets. This structure when used in a permanent magnet dynamoelectric machine provides a machine which may utilize substantially less magnetic material and substantially less conductive wire in the armature to produce a machine having comparable performance to machines constructed in accordance with the teachings of the prior ar.

What I claim is:

1. A permanent magnet dynamoelectric machine comprising a rotor and a stator rotatably supporting said rotor, four permanent magnets, and two ferromagnetic flux path members mounted in said stator, each of said flux path members having end portions engaging two of said permanent magnets both of the permanent magnets in contact with one of said flux path members having a first commonly designated magnetic pole facing said armature and having their oppositely designated magnetic poles in engagement with said end portions of said one ferromagnetic flux path member, both of the permanent magnets in contact with the second flux path member having a first commonly designated magnetic pole in engagement with said end portions of said second flux path member and their oppositely designated magnetic poles facing said rotor whereby one of said flux path members is polarized as a magnetic north and the other of said flux path members is polarized as a magnetic south and the portions of the flux path member intermediate their ends form consequent poles to provide a six pole dynamoelectric machine using only four permanent magnets.

2. The machine according to claim 1 wherein each one of the four permanent magnets is arranged to be in contact with an end portion of no more than one ferromagnetic flux path member.

3. The combination of claim 2 in which each of said flux path members has a body portion positioned intermediate said end portions, each of said body portions having a portion facing said rotor and radially spaced from said rotor a distance substantially the same as the radial distance between said rotor and the magnetic poles of said permanent magnets facing said rotor.

4. The combination of claim 2 in which each of said flux path members has a body portion positioned intermediate said end portions, each of said body portions having a portion facing said rotor in closed spaced radial relationship to said rotor and forming a magnetic field pole of said motor of a polarity opposite to that of the polarity of the poles of the permanent magnets facing said rotor in engagement with its end portions.

5. A permanent magnet dynamoelectric machine comprising an armature, a housing rotatably supporting said armature, four flat block permanent magnets, and two ferromagnetic flux path members, each of said ferromagnetic flux path members having flat end portions and an intermediate body portion, one face of each of said flur flat block permanent magnets being positioned in engagement with one end of one of said ferromagnetic flux path members, said housing including means for locating said ferromagnetic flux path members and said permanent magnets in said housing in a position where the other face of each of said flat block permanent magnets is radially spaced from said armature and the body portion of each of said flux path members is radially spaced from said armature, said one face of the two permanent magnets in contact with one of said flux path members having a first magnetic polarity and said one face of the two permanent magnets in contact with the other flux path member having the opposite magnetic polarity whereby a six pole dynamoelectric machine is formed using four permanent magnets.

6. The machine according to claim 5 wherein the radially outer polarized faces of each of the permanent magnets are arranged so that the permanent magnets are in contactive engagement with one end of only one of the two ferromagnetic flux path members.

7. The combination of claim 6 in which the radial spacing between said armature and said other face of each of said permanent magnets and a part of said body portion of each of said ferromagnetic flux path members is substantially equal.

8. The combination of claim 6 in which a part of said body portion of each of said ferromagnetic flux path members is radially spaced from said armature a distance to provide an effective flux path from said other face of each of said flat block permanent magnets through said armature to said part of said body portion and through the end of said flux path member to said one face of said flat block permanent magnet whereby said part of said body portion of each of said flux path members forms a magnetic field pole for said dynamoelectric machine.

9. A dynamoelectric machine comprising a rotor and a stator, said stator including a housing member rotatably supporting said rotor, four permanent magnets and two ferromagnetic flux path members, said housing member including means for supporting one magnetic pole of each permanent magnet in radial spaced relationship to the outer periphery of said rotor, the other pole of each permanent magnet in engagement with one end portion of the two ferromagnetic flux members and a central portion of each ferromagnetic flux member in a radial spaced position from the outer periphery of said rotor to form magnetic field p poles for said dynamoelectric machine, said one magnetic pole of the permanent magnets and the magnetic field poles in said flux path member central portions arranged to be of lalternating polarity about the rotor whereby six flux paths through the rotor are formed.

10. The machine according to claim 9 wherein the other magnetic pole of each permanent magnet is supported such that each permanent magnet is in engagement with an end portion of only one ferromagnetic flux path member.

11. The combination of claim 10, in which each ferromagnetic flux path member has a flat end portion, each permanent magnet is of flat block construction, and one face of each permanent magnet is positioned in engagement with one flat end portion of said ferromagnetic flux path members.

12. The combination of claim 10 in which said means included in said housing member includes means for receiving said two ferromagnetic flux path members in a pressfit relationship.

13. The combination of claim 12 in which said means for receiving said two ferromagnetic flux path members in a pressfit relationship comprises an axially extending flange on said housing and a plurality of axially extending pins positioned radially inwardly of said axial extending flange a distance approximately equal to the thickness of said ferromagnetic flux path members, said ferromagnetic flux path members being positioned between said axially extending flange and said pins.

14. The combination of claim 13 and further comprising a pair of nonmagnetic tab means extending radially inwardly from said axially extending flange and in opposed relationship to one another, said tab means including means for receiving one edge of each of said flat block permanent magnets, the opposite edge of each of said permanent magnets being positioned in engagement with one of said axially extending pins.

15. A permanent magnet dynamoelectric machine comprising a rotor and a stator, a plurality of permanent magnets, an even plurality of ferromagnetic flux path members and means for holding said plurality of permanent magnets and said ferromagnetic flux path members in assembled relationship in said stator, each of said permanent magnets being polarized in a radial direction with respect to the axis of the dynamoelectric machine, the permanent magnets in engagement with alternate ones of the flux path members being polarized so that a commonly designated magnetic pole of the permanent magnets is facing the rotor and the permanent magnets in engagement with the remainder of the flux path members being oppositely polarized so that commonly designated magnetic pole is in contact with the assocaited flux path member, each of said ferromagnetic flux path members forming a magnetic field pole for the rotor intermediate the pole formed by two adjacent permanent magnets whereby the rotor will provide a number of flux paths determined by the number of permanent magnet poles added to the number of flux path members.

16. The machine according to claim 15 wherein each of said permanent magnets is in contact with only one ferromagnetic flux path member.

* * * * *

UNITED STATES PATENT OFFICE
CERTIFICATE OF CORRECTION

PATENT NO. : 3,889,141
DATED : June 10, 1975
INVENTOR(S) : Frank R. Merriam

It is certified that error appears in the above—identified patent and that said Letters Patent are hereby corrected as shown below:

The printed Serial Number (Bracket item 21) reads "363,992" and should be corrected to read --363,692--.

Signed and Sealed this fourteenth Day of October 1975

[SEAL]

Attest:

RUTH C. MASON
*Attesting Officer*

C. MARSHALL DANN
*Commissioner of Patents and Trademarks*